June 23, 1970  H. W. ANDERSEN ET AL  3,516,223
APPARATUS FOR MANAGING AND USING VOLATILE SUBSTANCES
Filed June 30, 1966  3 Sheets-Sheet 3

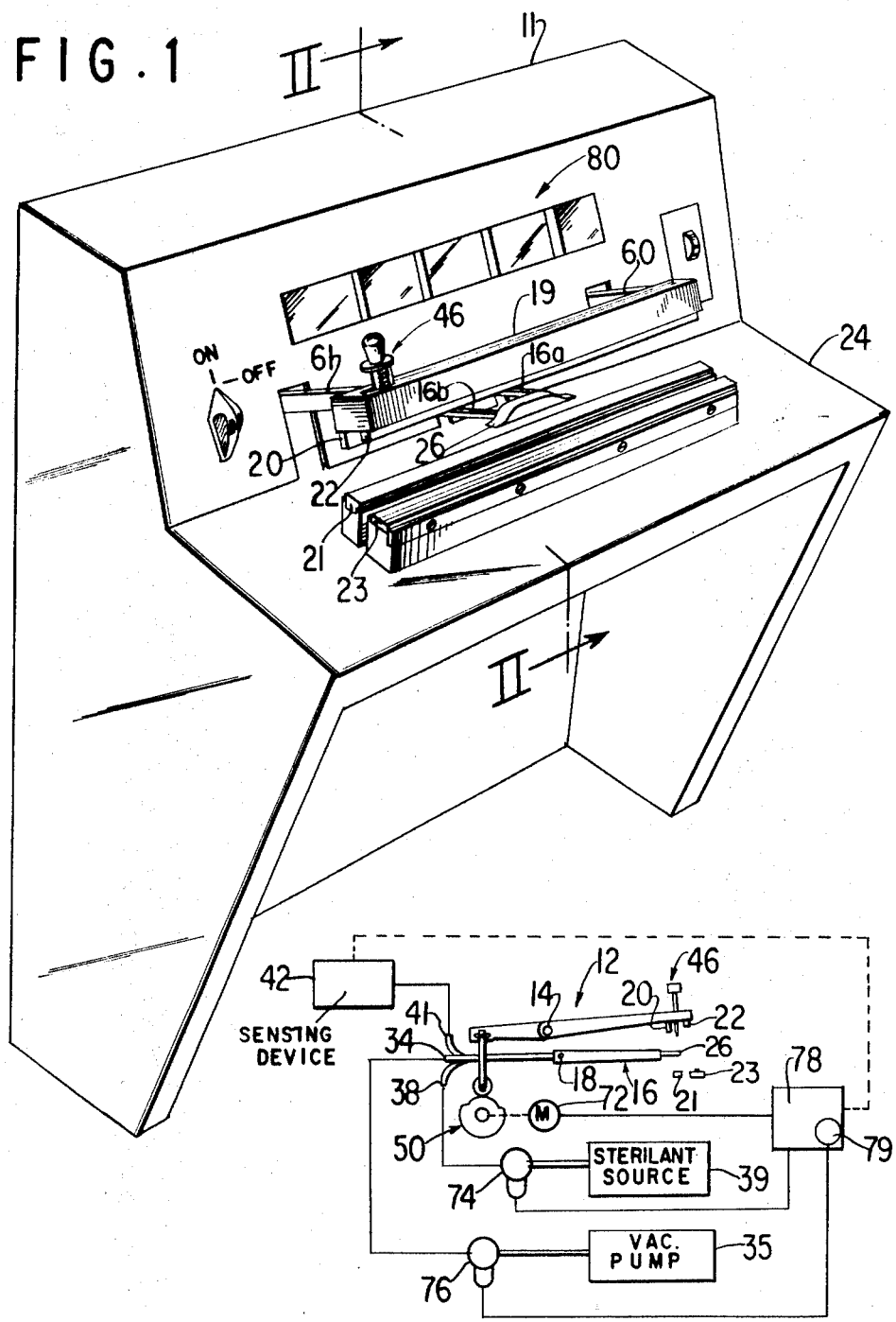

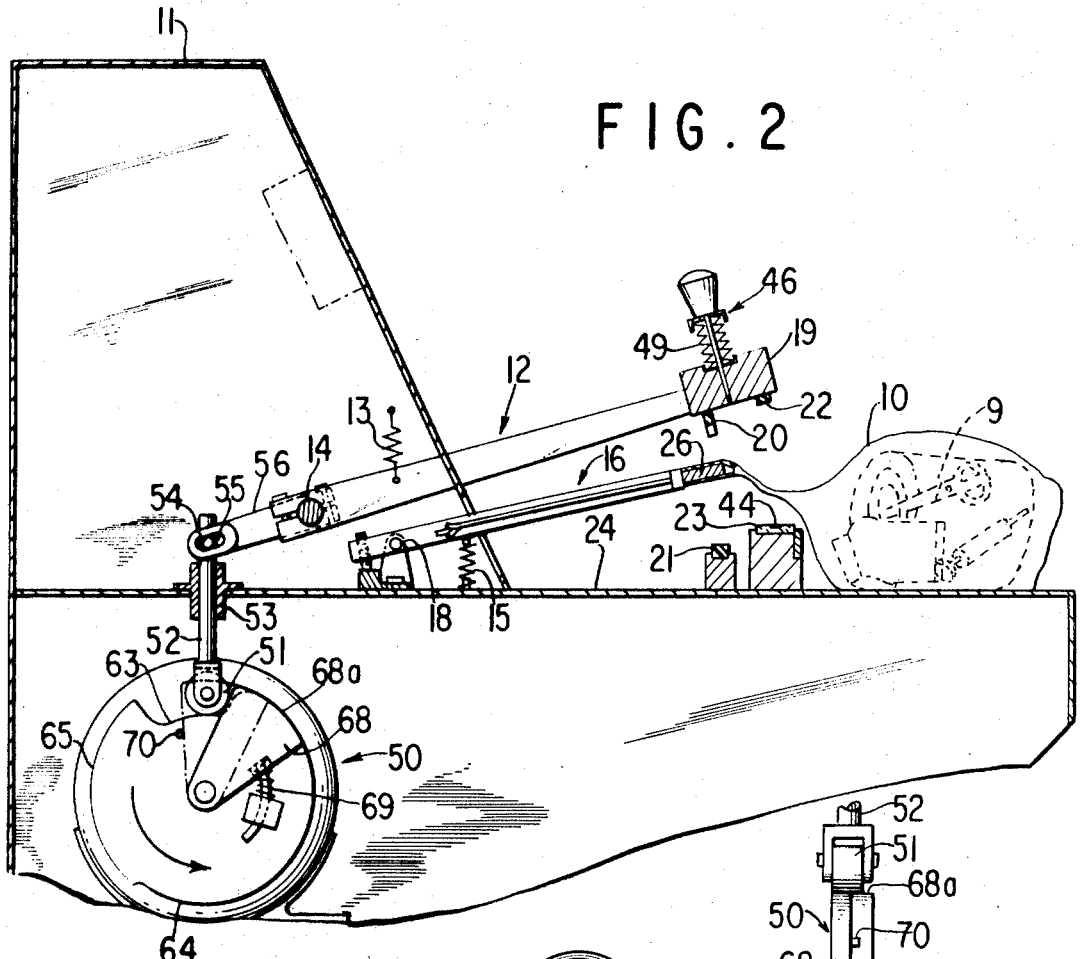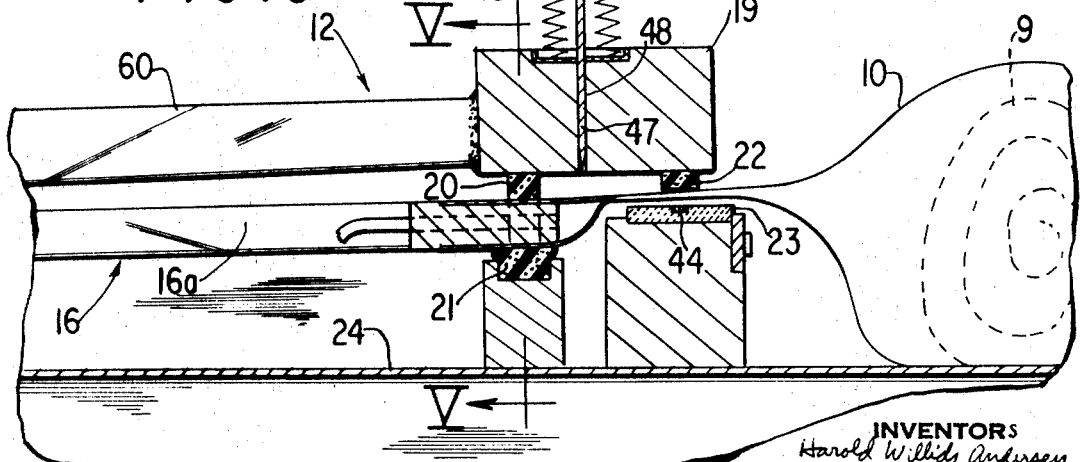

INVENTORS
Harold Willids Andersen
Harold W. Andersen and
BY Charles H. Harrison
Brown & Seward
ATTORNEYS United States Patent Office 3,516,223
Patented June 23, 1970

3,516,223
APPARATUS FOR MANAGING AND USING VOLATILE SUBSTANCES
Harold Willids Andersen, Oyster Bay, Harold W. Andersen, Laurel Hollow, and Charles H. Harrison, Oyster Bay, N.Y., assignors to H. W. Andersen Products, Inc., Oyster Bay, N.Y., a corporation of New York
Continuation-in-part of application Ser. No. 448,090, Apr. 14, 1965. This application June 30, 1966, Ser. No. 561,777
Int. Cl. B65b *31/06*
U.S. Cl. 53—112                          9 Claims

ABSTRACT OF THE DISCLOSURE

An apparatus is provided for sealing a fluid in an enclosure which includes first and second jaws for respectively clamping the enclosure opening and for clamping the enclosure at a position spaced from said first jaws.

---

This is a continuation-in-part application of prior copending application Ser. No. 448,090, filed Apr. 14, 1965.

This invention relates to an apparatus and method for managing and using volatile substances and is particularly adaptable for, but not liimted to, use with sterilants to effect sterilizing of medical, surgical, dental and other products, instruments, tools, apparatus and the like.

Heretofore, bulk sterilization has been performed on large items and on large quantities of products, instrument, tools and apparatus with gaseous sterilants, such as ethylene oxide, in large pressure vessels or autoclaves at elevated temperatures and pressures. Presently known techniques generally require that the materials to be sterilized be placed in open plastic bags within the sterilizing vessel. The bags remain open during the sterilization cycle to assure that the sterilant gases enter the plastic bags during the relatively short sterilization cycles currently employed. After the bulk sterilization is complete, the open bags are removed from the sterilizing vessel and subsequently sealed by conventional heat sealing equipment. One disadvantage of this known arrangement is that it is quite possible for the supposedly sterile materials to become contaminated as the open or unsealed bags are removed from the sterilizing vessel and transferred in the open atmosphere to the heat sealing equipment.

In the present invention there is no possibility of introducing contamination into an unsealed enclosure or bag because the latter is sealed with the sterilizing gas therein. Thus, according to the present invention, the items to be sterilized and the sterilant are placed or introduced into an enclosure (e.g. a plastic bag) and the latter sealed, the items being sterilized in the sealed enclosure. The enclosure is made, at least in part, with a semi-permeable wall capable of diffusing or passing the sterilant gas so that in time the sterilant gas in the enclosure will pass through said semi-permeable wall to the surrounding atmosphere, the sterilized items remaining encapsulated in the enclosure until ready for use. The air in the enclosure may be partially evacuated before the sterilant is introduced therein.

Accordingly an object of the present invention is to effect introduction of a volatile substance into an encapsulating enclosure which is capable of diffusing the volatile substance to the surrounding atmosphere.

Another object is to provide a sterilization method and apparatus which avoids introduction of contamination into an enclosure or bag containing sterilized items.

Another object is to effect sterilization within a sealed enclosure which is adapted to encapsulate the items being sterilized and keep them sterile until they are ready for use.

A further object is the provision of a method and apparatus which avoids bringing into contact with the items being sterilized heat, moisture, or corrosive fluids which might damage or impair delicate or heat sensitive instruments.

A further object is to provide certain improvements in the form, construction, arrangement and material of the several elements whereby the above named and other objects may effectively be attained.

A practical embodiment of the invention is shown in the accompanying drawings wherein:

FIG. 1 is a perspective view of an apparatus for effecting encapsulation of items to be sterilized.

FIG. 2 is a partial sectional view on an enlarged scale taken along the cutting plane II—II of FIG. 1.

FIGS. 2A is a partial side view of the operating cam and follower shown in FIG. 2.

FIG. 3 is a sectional view similar to FIG. 2 but on an enlarged scale showing the pivotal arm assembly in a different position.

FIG. 6 is a schematic representation of the controls and other associated elements used in operating the apparatus.

Figure 4:
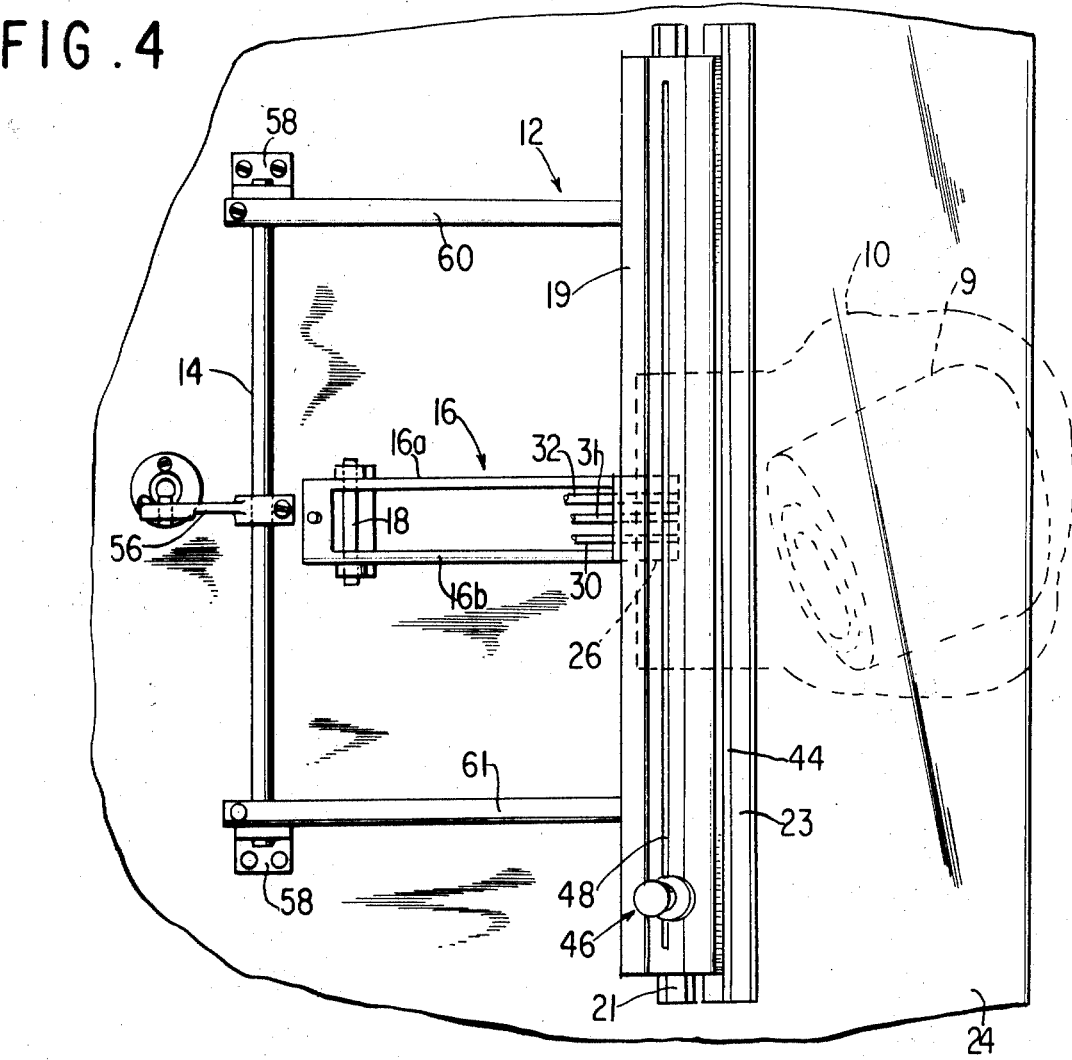
FIG. 4 is a partial plan view of the arm assembly and associated operating mechanism, part of which is not shown for the sake of clarity.

Referring to the drawings, FIGS. 1 and 2 show apparatus for encapsulating items 9 to be sterilized within a sealed enclosure in the form of a bag 10. The items 9 are initially placed in the bag 10 through its open end, the bag is placed on the apparatus as shown in FIG. 2, sterilant is introduced into the bag, and the latter is sealed, as will be described, the items 9 being sterilized within the sealed bag 10. The bag 10 is made of a semi-permeable material (e.g. polyethylene film) capable of passing a gaseous sterilant (e.g. ethylene oxide or mixtures thereof) to the surrounding atmosphere at a controlled rate which maintains a concentration of gaseous sterilant in the bag 10 sufficient to sterilize the items 9 and without releasing dangerous or harmful concentrations of the gaseous sterilant to the surrounding atmosphere. After the sterilant has diffused slowly into the surrounding atmosphere, the sterilized items 9 remain sterile and encapsulated within the sealed bag 10 until ready for use.

Turning to the structure shown in FIGS. 1 and 2, a cabinet 11 mounts an arm assembly, indicated generally at 12, for pivotal movement about an axis concentric with shaft 14. In a similar manner, a torpedo assembly, indicated generally at 16, is mounted for pivotal movement about an axis concentric with shaft 18. The assemblies 12 and 16 are biased against clockwise rotation (FIG. 2) by the tension spring 13 and compression spring 15, respectively.

The arm assembly 12 carries a support bar 19 on which are mounted a pair of jaws 20 and 22 which cooperate with similar jaws 21 and 23 mounted in fixed positions on the platform extension 24 of the cabinet 11 as will be further described. Clockwise pivotal movement will bring the jaws 20, 21 and 22, 23 in general overlying alignment.

The torpedo arm assembly 16 includes a pair of arms 16a, 16b (FIG. 4) carrying a torpedo 26 at their outer ends, the torpedo 26 being adapted to be interposed between the two jaws 20 and 21 when the arm assembly 12 is pivoted to the position shown in FIG. 3. As will be described in detail, the torpedo 26 and the pairs of jaws 20, 21 are adapted to receive the open end of bag 10 or similar enclosure containing items 9 to be sterilized and to isolate the bag from the surrounding atmosphere as the bag is evacuated of air and sterilant introduced, the jaws 22, 23 being adapted to effect a permanent seal on the bag 10 after the sterilant has been introduced.

Figure 5:
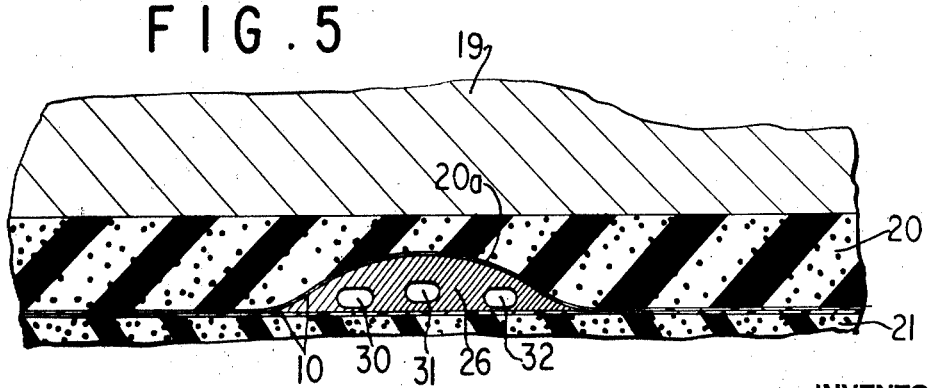
FIG. 5 is a partial sectional view taken on the cutting plane V—V of FIG. 3.

The aforesaid is accomplished by initially placing the open end of the bag 10 over the torpedo 26 while the jaws 20, 21 and 22, 23 are separated as shown in FIG. 2. The torpedo 26, of course, extends partially into the bag 10. Consequently, when the arm assembly 12 is pivoted clockwise, the jaw 20 will engage torpedo 26 and pivot the torpedo assembly 16 clockwise against the bias of spring 15 to contact jaw 21, the jaws 20, 21 being made of a soft resilient material, e.g. rubber, to seal the end of the bag 10 around the torpedo 26. As best shown in FIG. 5, the upper jaw 20 may have a cut out 20a to accommodate the torpedo 26 while the lower jaw 21 may be flat.

The torpedo 26 has three passages 30, 31 and 32 therein (FIG. 5). The passage 31 communicates with a conduit 34 leading to a source of reduced pressure such as the vacuum pump 35 (FIG. 6) while the passage 30 communicates with a conduit 38 leading to a source of sterilant 39. The third passageway 32 communicates with a conduit 41 leading to a reduced pressure sensing device 42 as will be described. It will be apparent that the bag 10 may be evacuated of air via torpedo passage 31 and thereafter, sterilant introduced via torpedo passage 30 while the jaws 20, 21 seal the open end of the bag 10 around the torpedo 26. The outer jaws 22, 23 are spaced apart (FIG. 3) during the evacuation and introduction of sterilant to allow free flow between the passages in the torpedo and the whole interior of the bag.

After the introduction of sterilant, the arm assembly 12 is pivoted clockwise slightly to close the outer jaws 22, 23 on the portion of the bag 10 therebetween. The inner jaws 20, 21 do not prevent the closing of the outer jaws 22, 23 because, as previously mentioned, the inner jaws 20, 21 are made of resilient material which can be compressed as the outer jaws 22, 23 are moved from the FIG. 3 position to a closed position.

After closure of the outer jaws 22, 23, an impulse of electric current is passed through a resistance wire 44 imbedded in or just below the surface of lower jaw 23. The upper jaw 22, which may be made of heat resistance rubber, presses the bag down against the heating wire 44. The wire 44 rapidly heats to a temperature sufficient to fuse the bag 10 but below the ignition temperature of the sterilant thereby forming a seal in the conventional manner of heat sealing.

A spring biased trimming knife, indicated generally at 46 and having a blade 47 slidable in slot 48 (see also FIG. 4) in support bar 19 may then be depressed against the bias of spring 49 and slid transversely in the slot 48 to sever the bag 10 between the two sets of jaws 20, 21 and 22, 23 whereby, upon release of the jaws 20, 21 and 22, 23, the sealed bag 10 may be removed.

Turning to more specific constructional details of the illustrated embodiment, the arm assembly 12 is actuated or pivoted by a cam, indicated generally at 50. A follower 51 which rides on the cam 50 is carried by a push rod 52, the latter being slidable in bearing 53 and having a lateral pin 54 at its upper end which is movable in a longitudinal slot 55 in the end of crank arm 56, the latter being secured to the shaft 14. The shaft 14 mounted in bearings 58 (FIG. 4) on the cabinet 11 carries spaced arms 60 and 61, the ends of which carry the support bar 19 on which the jaws 20–23 and the knife 46 are mounted.

The cam 50, upon rotation in a counterclockwise direction (FIG. 2), is adapted to engage the follower 51 and pivot the arm assembly 12 to three different positions, an open position (FIG. 2), a torpedo-engaging position (FIG. 3), and a closed position in which the two outer jaws 22, 23 are mated with a flattened section of the bag 10 therebetween. These three positions are obtained by the three cam surfaces 63, 64 and 65 respectively, which are progressively further removed from the axis of rotation of the cam 50. An auxiliary cam 68 is mounted on the main cam 50 but is arranged for partial pivotal movement relative to the main cam 50 about an axis coincident with the axis of rotation of the main cam 50. The main cam 50 carries a compression spring 69 which urges the auxiliary cam 68 towards a stop 70 protruding from the side of the main cam 50. The auxiliary cam 68 is shaped like a sector of a circle, the outer peripheral surface 68a having a radius which is the same as the radius of the surface 64 on the main cam 50.

The main cam 50 is adapted to be driven by an electric motor 72 (FIG. 6) to make one complete revolution for each operating cycle. Thus, with the cam follower 51 on cam surface 63 and the jaws 20, 21 and 22, 23 open (FIG. 2), an operator (having fitted a bag 10 on the torpedo) may manually depress the arm assembly 12 to close the jaws 20, 21 on the bag and torpedo 26. As a result, the cam follower 51 rises out of the path of relative pivotal movement of the auxiliary cam 68, thereby freeing the latter and allowing the spring 69 to push the auxiliary cam 68 from the solid line to the dotted line position shown in FIG. 2 where the auxiliary cam 68 will abut against the stop 70. The auxiliary cam surface 68a will then underlie the cam follower 51 and hold the arm assembly 12 in the FIG. 3 position after the operator lets go of the arm assembly 12. An automatic operating cycle may then be initiated as will be further described. As part of the automatic cycle, the cam 50 is rotated counterclockwise (FIG. 2), the follower 51 initially riding on the outer peripheral surface 68a of auxiliary cam 68 and then on the surface 64 of the main cam 50 without changing the pivotal position of the arm assembly 12 because, as previously mentioned, the aforesaid two surfaces 64 and 68a have the same radii.

While the follower 51 is on the surface 64 of main cam 50, the bag 10 is evacuated of air and sterilant introduced as previously described. By the time the bag 10 has been evacuated of air and supplied with sterilant, the cam 50 will be rotated by motor 72 to a position where the surface 65 comes under the follower 51 to thereby close the outer jaws 22, 23 and permit the heat seal to be effected. After the heat seal is made, the trimmnig knife 46 is manually operated to sever the sealed bag as previously described and the cam 50 is rotated further until the follower 51 drops down from surface 65 to surface 63 whereupon the jaws 20, 21 and 22, 23 are opened (FIG. 2). As the cam 50 rotates further, the follower 51 engages the radial side surface of the auxiliary cam 68 and pushes the latter against the bias of spring 69 away from the stop 70 until the auxiliary cam 68 finally comes to rest in the solid line position shown in FIG. 2. The spring 69 is compressed thereby so that the auxiliary cam 68 will be urged back up against the stop 70 by the spring 69 upon commencement of the next operating cycle when the arm assembly 12 is depressed and the follower 51 raised as aforesaid.

As previously indicated, the apparatus described above is adaptable to be automatically controlled. To this end solenoid valves 74 and 76 (FIG. 6) may be provided in the conduits 38 and 34 leading from the torpedo 26 to the sterilant source 39 and vacuum pump 35 respectively. These two solenoid valves, along with the vacuum sensing switch 42 previously mentioned, are electrically connected to a control unit 78 which includes a timer 79 and controls for starting and stopping the cam drive motor 72 at the proper positions of the cam 50. The control unit 78 may be actuated after the operator has manually depressed the arm assembly 12 to clamp the bag 10 around the torpedo 26 and after the position of the bag 10 has been tested electrically (by means not shown) to determine if it has been correctly positioned around the torpedo 26. Upon actuation, the controls in the control unit 78 start the cam motor 72 to rotate the cam 50 from a position where the auxiliary cam operating surface 68a underlies the follower 51 to a position where the surface 64 on the main cam 50 underlies the follower 51. Also the timer 79 activates the solenoid valve 76 connecting the vacuum pump 35 to the interior of the bag 10 and the latter is partially evacuated. The timer 79 is electrically connected to the reduced pressure sensing switch 42 which determines when sufficient air has been withdrawn from the bag 10 and a partial vacuum established in the collapsed bag 10. The timing device then closes solenoid valve 76 and opens solenoid valve 74 which permits sterilant gases to enter the bag 10 and inflate it. At the end of a predetermined time peroid, which is a function of the volume of the bag 10 in which the items 9 to be sterilized are sealed, the timing device closes solenoid valve 74 and terminates the flow of sterilant.

Upon completion of the pre-vacuum and sterilant injection, the timer again starts the cam motor 72 to rotate the cam 50 to a positoin where the cam surface 65 underlies the follower 51 to thereby close the outer jaws 22, 23 and thereafter provide the electrical impulse for the resistance wire 44 to effect the heat seal as previously described. The sealed bag 10 may then be manually trimmed by the knife 46, as described above, and the cam 50 rotated by the motor 72 to the initial position shown in FIG. 2 to release the sealed bag 10 and ready the apparatus for a repeat cycle on another bag.

Various panel lights indicated generally at 80 may be placed on the panel to facilitate operation and to insure that proper procedure is being followed. The panel lights 80 may have legends indicating to the operator that the apparatus is in condition to receive the bag 10 and that the arm assembly 16 is ready to be pushed down manually, that everything is in readiness to commence introduction of sterilant, and to indicate the proper time to safely operate the trimming knife. Other lights may indicate a warning that the bag 10 has not been correctly positioned, that introduction of sterilant is in progress, that proper sterilization has not been achieved, etc.

Various alternate embodiments may be employed. For example, the automatic controls (e.g. control unit 78, timer 79, cam 50, etc.) may be dispensed with and the arm assembly 12 operated manually. In place of the illustrated torpedo 26, one or more tubes or conduits may be employed in which case a temporary seal would be effected along the outer periphery of the tubes as air is evacuated and sterilant introduced into the bag through the interior of the tubes. A single conduit or tube may be used for air evacuation and introduction of sterilant. The torpedo may take various shapes as desired, for example, it may have a circular cross-section. The bag itself may be filled through a tube (e.g. made of plastic) which is secured on its outer periphery directly to the bag, the tube being clamped or otherwise obturated to seal the sterilant in the bag. Sterilant may be introduced directly into the bag, for example from an aerosol can. The bag may be closed or sealed as a delivery spout is withdrawn from the bag. Different forms of seals (e.g. adhesive, folding, crimping and twisting) may replace the heat seal. The trimming knife 46 may be actuated automatically by a solenoid or power piston and instead of being transversely slidable, the blade may extend the width of the jaws and be mounted for up and down movement.

Although the above described apparatus contemplates the introduction of one or more gaseous sterilants into the bag, it will be understood that sterilant in liquid form may also be introduced into the bag. When using liquid ethylene oxide, for example, the latter may be cooled below its boiling temperature (approximately 50 F.) prior to its introduction into the bag 10. Apparatus for handling ethylene oxide to facilitate dispensing in liquid form is described in copending application Ser. No. 556,134 filed June 8, 1966. As may be desired, the partial evacuation of air from the bag may be dispensed with prior to the introduction of sterilant.

It will be understood that the function of the enclosure or bag 10 is to encapsulate the items 9 to be sterilized and the sterilizing medium and to diffuse the latter to the surrounding atmosphere. Accordingly, it will be evident that other types of structures utilizing a semi-permeable membrane may be used in place of the bag. For example, the enclosure may be constructed partially of a rigid, impervious structure and a semi-permeable membrane.

As for the material of the semi-permeable membrane, a plastic film of polyethylene has been found to function satisfactorily, although other materials may be used, for example, polystyrene, acrylic, polyvinyl chloride, cellophane, saran, Mylar, paper, and others. The rate of diffusion of the sterilant through the semi-permeable walls of the enclosure may be controlled by selecting the proper dimensions, thickness, density, and pore size (i.e. permeability) of the enclosure.

It will be understood that the present invention may be used with gases other than ethylene oxide or with mixtures of gases which may or may not include ethylene oxide. Also, volatile liquids or mixtures thereof may also be used, the example of liquid ethylene oxide having already been set forth above, but other liquids or mixtures may also be used. In addition, solids may also be employed in the enclosure or bag, the solids, of course, being adapted to assume a gaseous form for ultimate release through the walls of the semi-permeable bag. The solid substance may be volatile at room temperature or below. An example of a solid which may be used is frozen ethylene oxide in the form of pellets. Compounds such as ethylene oxide and vinyl may be used. Also camphor may be used.

It will be understood that the volatile gas released through the semi-permeable wall may be used for other purposes besides sterilization. For example, insecticides or fungicides may be released through the semi-permeable enclosure to the surrounding atmosphere at a rate affording control of insects and fungi in the surrounding area. When insecticides or fungicides are used, these latter may be the sole substance introduced into the enclosure.

It will be understood that various changes may be made in the form, construction and arrangement of the several parts without departing from the spirit and scope of the invention and hence we do not intend to be limited to the details shown or described herein except as the same are included in the claims or may be required by disclosures of the prior art.

What we claim is:

1. Apparatus for sealing a fluid in an enclosure which is initially provided with an opening, comprising clamping means engaging the enclosure opening and temporarily isolating the interior of the enclosure from the surrounding atmosphere, said clamping means comprising a member adapted to fit into the opening of the enclosure and relatively movable structures carrying first jaws for clamping said enclosure opening on said member and second jaws, said first jaws being made of a compressible material whereby the latter jaws may be compressed different amounts for various relative clamping positions of said movable structures, one of said positions being such that said second jaws are spaced from one another and another said position being such that said second jaws press the enclosure therebetween, said clamping means having a feed conduit leading to the enclosure interior, means for introducing fluid into said enclosure via said feed conduit, and sealing means for permanently sealing said opening in said enclosure while the enclosure interior is isolated from the surrounding atmosphere by said clamping means.

2. Apparatus for sealing a fluid in an enclosure which is initially provided with an opening, comprising clamping means engaging the enclosure opening and temporarily isolating the interior of the enclosure from the surrounding atmosphere, said clamping means comprising a member adapted to fit into the opening of the enclosure and relatively movable structures carrying first jaws for clamping said enclosure opening on said member, said clamping means having a feed conduit leading to the enclosure interior, means for introducing fluid into said enclosure via said feed conduit, and sealing means for permanently sealing said opening in said enclosure while the enclosure interior is isolated from the surrounding atmosphere by said clamping means, said member having means defining an exit conduit leading from the interior of said enclosure to a source of reduced pressure, whereby said enclosure may be evacuated of at least some of the air therein through said exit conduit.

3. Apparatus according to claim 1 wherein said first jaws are spaced from said second jaws, and means are provided which are operable in the space between the first and second jaws to cut off the clamped portion of the enclosure from the remaining section which includes the enclosure seal.

4. Apparatus according to claim 2 comprising means for pivoting at least one of said relatively movable structures and said member about one or more fixed axes.

5. Apparatus according to claim 2 wherein at least one of said first jaws is provided with a surface shaped to the contour of said member.

6. Apparatus according to claim 1 wherein said second jaws comprise a pair of relatively movable sealer parts, and heating means on at least one of said sealer parts to heat a portion of said enclosure to effect a heat seal on said enclosure.

7. Apparatus according to claim 1 comprising means for pivoting at least one of said relatively movable structures and said member about one or more fixed axes.

8. Apparatus according to claim 1 wherein at least one of said first jaws is provided with a surface shaped to the contour of said member.

9. Apparatus according to claim 2 wherein said second jaws comprise a pair of relatively movable sealer parts, and heating means on at least one of said sealer parts to heat a portion of said enclosure to effect a heat seal on said enclosure.

References Cited
UNITED STATES PATENTS

| | | | |
|---|---|---|---|
| 2,732,988 | 1/1956 | Feinstein | 53—112 |
| 2,780,043 | 2/1957 | Hensgen | 53—86 |
| 2,858,655 | 11/1958 | Mahaffy | 53—86 |
| 3,016,284 | 1/1962 | Trexler | 53—21 |
| 3,088,255 | 5/1963 | Griem | 53—25 X |
| 3,164,934 | 1/1965 | Pancratz | 53—112 |
| 3,182,432 | 5/1965 | Canfield | 53—112 |
| 3,191,356 | 6/1965 | Zelnick | 53—372 X |
| 3,304,687 | 2/1967 | Tomczak | 53—112 |
| 3,343,331 | 9/1967 | French | 53—22 |
| 3,358,415 | 12/1967 | Kurfirst | 53—22 |
| 3,350,838 | 11/1967 | Rodrigues | 53—86 |

WAYNE A. MORSE, JR., Primary Examiner

U.S. Cl. X.R.

53—7, 39, 86, 372